United States Patent [19]

Mason et al.

[11] Patent Number: 5,487,836
[45] Date of Patent: Jan. 30, 1996

[54] METHOD OF CLEANING A SINTERED POWDERED METAL FILTER

[75] Inventors: Charles M. Mason, Clyde; Ted L. Sutton, Enka, both of N.C.

[73] Assignee: BASF Corporation, Mt. Olive, N.J.

[21] Appl. No.: 371,495

[22] Filed: Jan. 11, 1995

Related U.S. Application Data

[63] Continuation of Ser. No. 81,575, Jun. 23, 1993, abandoned.

[51] Int. Cl.$^6$ ................................................. B01D 29/62
[52] U.S. Cl. ...................... 210/791; 210/749; 210/797; 210/798; 134/22.16; 134/22.17; 134/22.18; 134/22.19; 134/26; 425/225
[58] Field of Search ..................... 210/785, 791, 210/797, 798, 636, 407, 409, 411, 106, 108, 510.1, 749, 770; 425/197, 198, 225, 226; 134/22.12, 26, 22.13, 22.14, 22.15, 22.16, 22.17, 22.18, 22.19

[56] References Cited

U.S. PATENT DOCUMENTS

| | | | |
|---|---|---|---|
| 3,084,076 | 4/1963 | Loucks et al. | 134/22.15 |
| 3,788,486 | 1/1974 | Bergstrom | 210/496 |
| 3,865,628 | 2/1975 | Callahan et al. | 134/22.19 |
| 4,200,471 | 4/1980 | Burghardt et al. | 134/22.12 |
| 4,493,756 | 1/1985 | Degen et al. | 204/145 R |
| 4,954,180 | 9/1990 | Malloy | 134/22.13 |
| 5,240,613 | 8/1993 | Tsuchitani et al. | 210/636 |
| 5,246,589 | 9/1993 | Nichols et al. | 210/791 |

OTHER PUBLICATIONS

Chemiefasern/Textilindustrie, vol. 34/86 (Jun. 1984), pp. 409–411 translated by J. Cornelsen.

Engineering Report No. 1–12 by Fuji Filter Manufacturing Co., Ltd., Charlotte, N.C. (Jan. 1992).

R. E. Duffy, "Basic Methods for Removing Polymer from Parts", International Fiber Journal (Jun. 1991).

F. Fourne, Chemiefasern/Textilindustrie, vol. 35/87 (Jun. 1985), pp. 397–403.

F. Fourne, Kunststoffe, 79 (1989) 9, pp. 807–813.

*Primary Examiner*—John Kim
*Attorney, Agent, or Firm*—Nixon & Vanderhye

[57] ABSTRACT

A method of cleaning polymer residue from a polymer melt filter formed of a sintered powdered metal includes pyrolyzing the polymer residue-contaminated filter within a heated chamber at a temperature within the range from about 400° to about 600° C. and for a time sufficient to pyrolyze substantially all of the polymer residue. Simultaneously with such treatment, the heated chamber is flushed with steam to prevent combustion of the polymer residue. The pyrolyzed filter is then treated with a solvent and back-flushed with a pressurized fluid stream by passing the fluid steam through the filter in a direction opposite to the polymer melt flow therethrough.

24 Claims, 2 Drawing Sheets

METHOD OF CLEANING A SINTERED POWDERED METAL FILTER

This is a continuation of application Ser. No. 08/081,575, filed Jun. 23, 1993, now abandoned.

FIELD OF THE INVENTION

The present invention is directed to a method of cleaning a sintered powdered metal filter for the filtration of a polymer melt in an extruder at a spinnerette during the manufacture of fibers, more specifically it is directed to a method of cleaning which comprises a flushing of the filter with a water and air stream against the flow direction of the melt through the filter.

BACKGROUND OF THE INVENTION

During the manufacture of fibers by melt-spinning a polymer through an extruder with a spinnerette the melt is filtered at the spinnerette to provide a homogeneous polymer to the spinnerette and to remove melt impurities like gels, carbonized materials and inorganic particles. Ineffective filtration increases the incidence of fiber breakage during spinning and drawing and clogged spinnerettes, J. Cornelsen, Oelde, "New Developments in the Filtration of Polymer Melts," Chemiefeslon/Tesetil-industrie, Sol. 34/86, June 1984, pp. 409–411.

Two different types of filter elements are used in polymer spin pack filtration to remove the contaminants mentioned above. These are surface and depth elements, Engineering Report No. 1, Fugi Filter Manufacturing Co. LTD.

Surface elements capture all particles by surface disposition, requiring all the pores of the element to be about the same size to achieve the desired degree of filtration. A single layer of wire screen mesh is an example of this type of media.

The depth filter element is made up of a porous structure with thickness and voids which allow particulate matter to be trapped in the interstices and the clean polymer to flow through. This "straining in depth" action of a depth filter is enhanced by changes in the fluid velocity and direction through the porous structure, which results in entrapment and sedimentation of the particles.

Examples of depth filter elements are wire cloth, random wire fiber, and sintered metal powders. The first type of filters can be easily cleaned because the particles are retained on the surface of the filter.

Cleaning methods for the second filter type are more difficult, and typically involve cleaning with chemical and thermal means with ultrasonics as a post-cleaning step.

Cleaning by thermal means are described for example in Duffy, Robert E., "Basic Methods for Removing Polymer from Parts," International Fiber Journal, June 1991.

Methods comprise incinerating furnace or oven, salt bath, vacuum oven and fluidized bed.

Chemical methods are described for example in Fourne, F., "Cleaning of Polymer Soiled Machine Parts," Chemiefasern/Textilindustrie (CTI), Vol. 35/87 (June 1985), pp. 397–403, and comprise use of solvents.

Postcleaning operations like ultrasonic cleaner are described for example in Fourne F., "Cleaning of Machine Parts and Molds Contaminated With Plastics," Kunststoffe, 79 (1989) 9, pp. 807–813.

Disadvantage of all methods of the prior art is that the cleaning is insufficient and rest particles stay in the filter causing a faster pressure build up when reused.

Object of the present invention was to provide a method of cleaning depth filter elements, especially sintered metal filters so that the pressure build up after the cleaning is as low as possible and the air permeability through the filter does not derive significantly in comparison to a new filter.

SUMMARY OF THE INVENTION

The present invention is embodied in a method of cleaning polymer residue from a polymer melt filter formed of a sintered powdered metal. In this regard, the polymer residue-contaminated filter is pyrolyzed within a heated chamber at a temperature within the range from about 400° to about 600° C. and for a time sufficient to pyrolyze substantially all of the polymer residue. Simultaneously with such treatment, the heated chamber is flushed with steam to prevent combustion of the polymer residue. The pyrolyzed filter is then treated with a solvent and back-flushed with a pressurized fluid stream by passing the fluid steam through the filter in a direction opposite to the polymer melt flow therethrough.

DETAILED DESCRIPTION OF THE INVENTION

The method of the present invention is suitable for cleaning depth filter elements for the filtration of polymer melts during the manufacture of fibers by melt spinning of a fiber forming polymer, especially for sintered powdered metal filters. Suitable polymers for the manufacture of the fibers according to the present invention are all fiber forming thermoplastic materials especially polyamides, polyesters, and polyolefins. Suitable polyamides are nylon 6, nylon 6/6, nylon 6/9, nylon 6/10, nylon 6/12, nylon 11, nylon 12, copolymers thereof and mixtures thereof.

Preferred polyamides are nylon 6 and nylon 6/6. A suitable polyester is polyethylene terepthalate.

Figure 1:
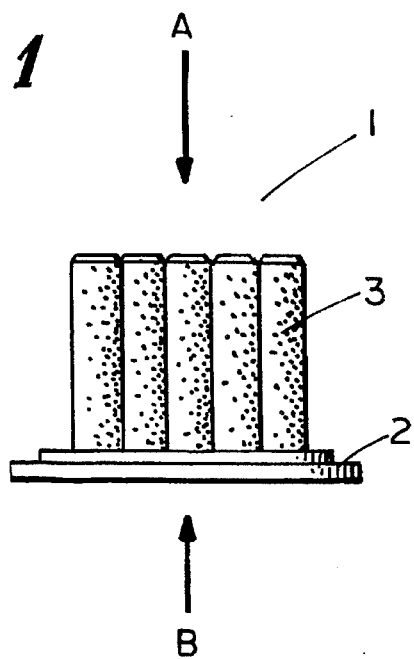
FIG. 1 shows a side view of a sintered powdered metal filter (1).

The polymer is fed into an extruder in form of chips or granules, melted and directed via jacketed Dowtherm® (Dow Chemical, Midland Mich.) heated polymer distribution lines to the spinning head, where it is filtered by a depth filter element like the one shown in FIG. 1 and extruded through a spinnerette plate with capillaries to form the fibers.

Figure 3:
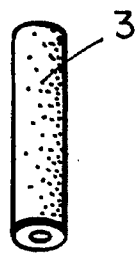
FIG. 3 shows a single filter candle (3) of the sintered powdered metal filter.
Figure 2:
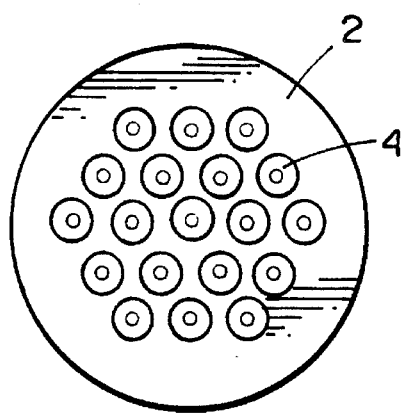
FIG. 2 shows a top view of the sintered powdered metal filter from the flow direction (B).

FIG. 1 shows an example of a sintered powdered metal filter (1) with a filter plate (2) and a plurality of filter candles (3). (A) shows the flow direction of the polymer melt and (B) shows the direction of the flushing of the filter with water and air stream. FIG. 2 shows a top view of the sintered powdered metal filter (1) from the flow direction (B) with openings (4) for the filter candles (3). FIG. 3 shows a single filter candle (3). One type of filter is commercially available under Mott® filter from Company Mott Metallurgical Corp., U.S.A.

A suitable filter for the present invention has from about 1 to about 200 candles, preferably from about 5 to about 42 candles. The candles have capillary diameters from about 1 to about 50 microns, preferably from about 2 to about 40 microns, most preferred from about 2 to about 10 microns.

In the clearing step (a), the filter is treated at a temperature of from about 400° to about 600° C., preferably from about 460° to about 510° C. for the pyrolysis of the polymer. This may be done in an incinerating furnace or oven, a salt bath, a vacuum oven or a fluidized bed. An oven like a Lindberg oven (Lindberg, U.S.A.) is preferred.

The Lindberg oven requires only electricity and water. The parts are placed in a heated chamber, flushed with steam to prevent any combustion from taking place. During a portion of the cycle, the polymer is heated above the melting point. Approximately 90% of the polymer drips from the parts into a trap in the bottom of the oven where it solidifies and is removed. The remainder of the polymer is pyrolyzed and the gases are removed by the steam. The advantages of the Lindberg oven are moderate energy consumption, good temperature control, safe operation and no environmental controls required.

After the filter is removed from the chamber it is treated in step (b) with at least one solvent. The preferred solvent is water. The filter is put in the water at a temperature from about 20° to 100° C., preferably 50° to 100° C. for a time period of from about 1 minute to about 1 hour, preferably from about 2 minutes to about 20 minutes.

After this water treatment an additional treatment with an organic solvent may follow. Suitable organic solvents are alkylene glycols like ethylene glycol, diethylene glycol and triethylene glycol.

The organic solvents may contain an alkali metal salt like sodium carbonate, potassium carbonate, sodium hydroxide or potassium hydroxide in an amount of from about 5% to about 50% by weight based on the weight of the total mixture of solvent and salt.

Preferred is a ethylene glycol and potassium hydroxide mixture. The filter is treated with this solvent at a temperature of from about 140° to about 200° C., preferably from about 150° to about 190° C. over a time period of from about 1 minute to about 3 hours, preferably from about 1 hour to 2 hours.

After this treatment the filter is mixed with water followed by step (c) flushing the filter with a stream of water, steam or air against the flow direction of the melt through the filter. The steam is under a pressure of from about 60 to about 100 psig, preferably from about 80 to about 90 psig. Preferred is a water and air stream. This flushing of the filter with a pressure stream against the flow direction is the crucial step in the cleaning procedure. This step insures that smallest particles in the depth of the filter capillaries are loosened and removed from the filter.

The filter is dried for example by blowing air through the filter or placing it in a warm oven or both.

Optionally an additional step may be added by treating the filter in an ultra sonic water bath for about 1 minute to about 5 hours, preferably from about 1 hour to about 3 hours. A suitable ultrasonic device is Sonic bath Intex 8667C from Lewis Corp., U.S.A.

This optional step is followed by drying the filter.

Figure 4:
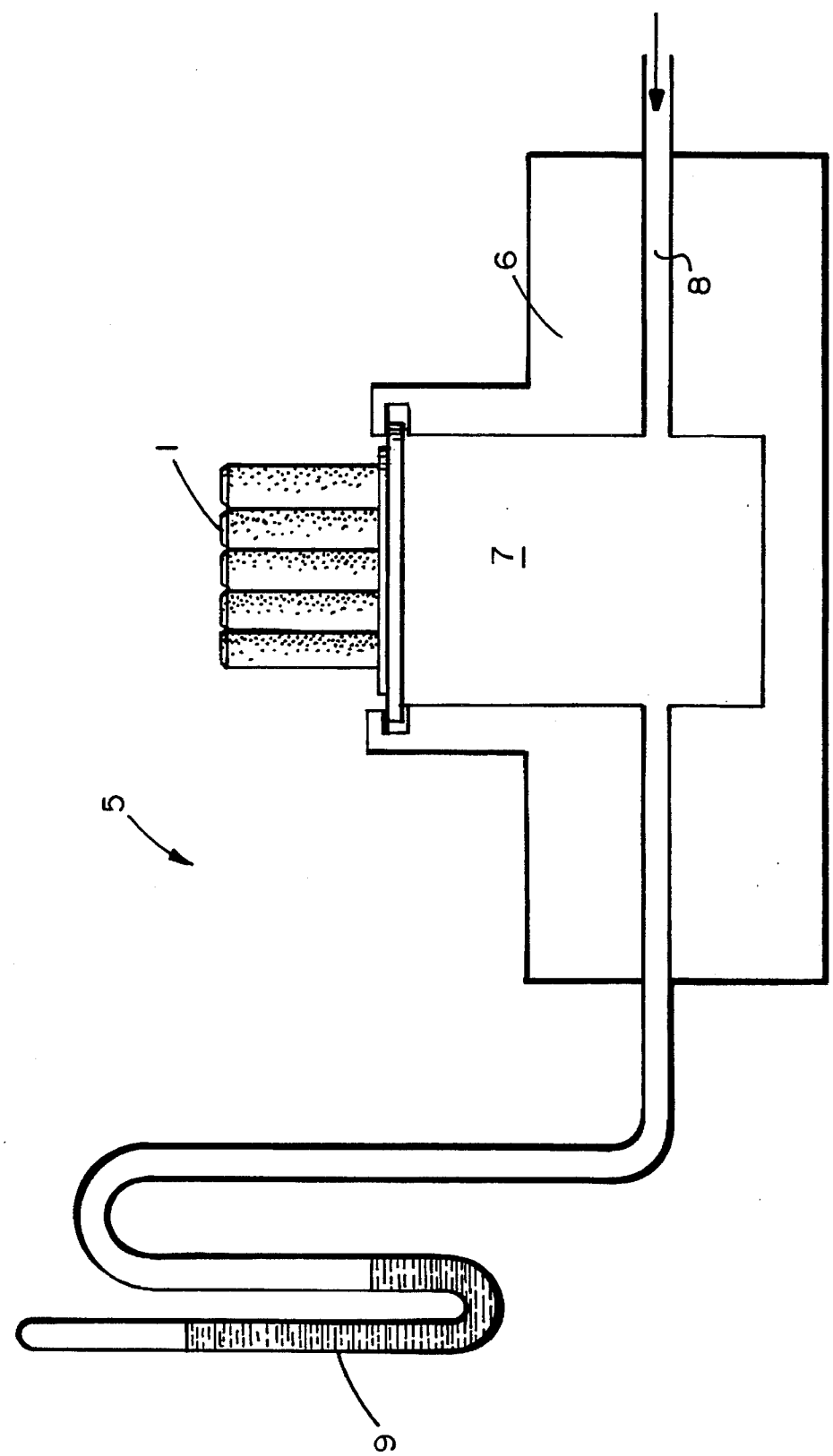
FIG. 4 shows the permeability test device (5).

The degree of cleanliness is measured in an air permeability test, which is shown in FIG. 4:

The filter (1) is fixed over a gas chamber (7) in a block (6), having a gas channel (8), which is connected to a manometer (9). The arrow shows the direction of the air, which flows through the filter (1) and to the manometer (9). The cleaner the filter (1), the higher is the gas permeability and the more air flows through the filter, showing a low pressure on the manometer. If the filter is blocked by particles the permeability is lower and a pressure build up is shown by the manometer. The scale of the manometer ranges from 0 to 39 inches of water.

EXAMPLES

Example 1

In an extruder Nylon 6 (Ultramid® BS-700 of BASF AG, Ludwigshafen, Germany) with a relative viscosity of 2.7 (1 g in 100 ml 96% by weight of sulfuric acid at 25° C.) with 1% by weight of carbon black was extruded and filtered through a Mott® filter with 19 candles with a capillary diameter of 3 microns for one week. After removing the filter it was placed in a Lindberg oven at 510° C. for three hours and five minutes. The oven was flushed with steam during this time period. After removing the filter from the oven it was placed in boiling water and placed into an ethyleneglycol bath with 10% potassium hydroxide at a temperature of 150° C. for 1½ hours. The filter was removed from this bath and mixed with water of 60° C. The filter was placed up side down and flushed with a jet gun with 90 psig air and water against the flow direction of the polymer, which is the (B) direction. The filter is washed again with water for 5 to 15 seconds and placed in a sonic bath (Intex 8667C) at 70° C. up side down for 1½ hours. The filter is then placed in hot water at 75° C. and blown dry with 90 psig air followed by placing it in a warm oven overnight to dry.

After this the permeability is tested with the test described above and the result is shown in the table. The filter is reused for another week and the cleaning procedure is repeated.

Example 2

Example 1 was repeated with another Mott® filter with 19 candles with a capillary diameter of 3 microns.

Example 3(Comparative Example)

Example 1 was repeated without the flushing step with the jet gun against the flow direction of the polymer melt. The filter could not be reused a second time because the permeability was too low.

TABLE

| | Pressure (inches of water) | | |
| --- | --- | --- | --- |
| Examples | New Filter | After 1 Cleaning | After 2 Cleanings |
| 1 | 14 | 16.5 | 16.4 |
| 2 | 14 | 15.5 | 15.4 |
| 3 (comparative) | 14 | >39 | Not reusable |

We claim:

1. A method of cleaning polymer residue from a polymer melt filter formed of a sintered powdered metal, said method comprising the steps of:

a) placing the filter containing the polymer residue within a heated chamber and then subjecting the filter therein to a temperature of from about 400° to about 600° C. for a time period of 1 to 5 hours while simultaneously flushing the heated chamber with steam so as to prevent combustion of the polymer residue;

b) treating the filter with at least one solvent; and c) back-flushing the filter by passing a fluid stream selected from the group consisting of water, steam, and water and air through the filter in a direction opposite to the polymer melt flow therethrough; and d) drying the filter.

2. The method according to claim 1, wherein the polymer melt filter has pores of a diameter of from about 1 micron to about 50 microns.

3. The method according to claim 1, wherein the temperature in step (a) is from about 460° to about 510° C.

4. The method according to claim 1, wherein step (c) is practiced by back-flushing the filter with water.

5. The method according to claim 4, wherein step (c) is practiced by back-flushing the filter with water at a temperature of from about 50° to about 100° F.

6. The method according to claim 4, wherein following step (c), there is practiced the step of treating the filter with alkylene glycol comprising an alkali metal salt.

7. The method according to claim 6, wherein the alkylene glycol is ethylene glycol.

8. The method according to claim 6, wherein the alkali metal salt is selected from the group consisting of potassium carbonate, sodium carbonate, potassium hydroxide and sodium hydroxide.

9. The method according to claim 6, wherein following treatment of the filter with alkylene glycol comprising an alkali metal salt, there is practiced the step of mixing the filter with water.

10. The method according to claim 1, wherein step (c) is practiced using a fluid stream comprised of water and air stream under a pressure of 90 psig.

11. The method according to claim 1, wherein step (c) is practiced using steam as the fluid stream.

12. The method according to claim 1, wherein step (d) is practiced by blowing air through the filter.

13. The method according to claim 1, wherein between steps (c) and (d) there is practiced the further step of cleaning the filter in a water bath with ultrasonic waves.

14. A method of cleaning polymer residue from a filter element contaminated by the same from filtration of a polymer melt flow, said method comprising the steps of:

(a) pyrolyzing the polymer residue-contaminated filter element within a chamber heated to a temperature within the range of from about 400° to about 600° C. and for a time sufficient to pyrolyze substantially all of the polymer residue while simultaneously flushing the chamber with steam to prevent combustion of the polymer residue;

b) treating the pyrolyzed filter element obtained from step (a) with a solvent; and (c) back-flushing the filter element with a pressurized fluid stream by passing the fluid stream through the filter element in a direction opposite to the polymer melt flow therethrough.

15. A method as in claim 14, wherein step (a) is practiced by subjecting the polymer residue-contaminated filter element to a pyrolysis cycle which includes the steps of:

(i) heating the filter element within the chamber during a portion of a pyrolysis cycle to a temperature above the melting point of the polymer residue such that at least about 90% of the polymer residue melts and drips from the filter element;

(ii) collecting the drips of melted polymer residue within a trap and allowing the collected drips of polymer residue to solidify therein; and thereafter (iii) heating the filter element during another portion of the cycle to a temperature within the range of from about 400° to about 600° C. and for a time sufficient to pyrolyze substantially all of the remaining polymer residue while simultaneously flushing the chamber with steam to prevent combustion of the remaining polymer residue.

16. A method as in claim 14, wherein the solvent employed in step (b) is water.

17. A method as in claim 14, further comprising the step of:

(d) bringing the pyrolyzed filter element obtained according to step (a) into contact with an organic solvent.

18. A method as in claim 17, wherein the organic solvent is an alkylene glycol.

19. A method as in claim 18, wherein the alkylene glycol is one selected from the group consisting of ethylene glycol, diethylene glycol and triethylene glycol.

20. A method as in claim 17, wherein the organic solvent is a mixture of an alkylene glycol and an alkali metal salt.

21. A method as in claim 20, wherein the alkali metal salt is one selected from the group consisting of sodium carbonate, potassium carbonate, sodium hydroxide and potassium hydroxide.

22. A method as in claim 21, wherein the alkali metal salt is present in an amount from about 5% to about 50% by weight, based on the weight of the mixture.

23. A method as in claim 14, which further comprises the step of subjecting the pyrolyzed filter element to ultrasonic cleaning in an ultrasonic cleaning bath.

24. A method as in claim 14, which further comprises the step of drying the pyrolyzed filter element.

* * * * *